Aug. 31, 1926.

R. A. WALLIN 1,597,701

DRUM TRAP

Filed May 15, 1925

Inventor

RICHARD A. WALLIN.

By Geo. Stevens.

Attorney

Patented Aug. 31, 1926.

1,597,701

UNITED STATES PATENT OFFICE.

RICHARD A. WALLIN, OF DULUTH, MINNESOTA.

DRUM TRAP.

Application filed May 15, 1925. Serial No. 30,539.

This invention relates to plumbing fixtures and has special reference to what is known as drum traps, ordinarily associated with the discharge of a bath tub, or the like.

The principal object of the invention is to provide a more compact form of trap for installation within a floor of the least possible depth without lessening the efficiency of the trap.

Other objects and advantages of the invention will appear in the further description thereof.

Referring now to the accompanying drawing, forming part of this application, and in which like reference characters indicate like parts:

The principal part of my present invention resides in the peculiarly shaped discharge of the trap, the vertically disposed bowl of which is represented at 1, having the ordinary screw topped cover 2, and the novel form of discharge 3, the internally screw-threaded axial inlet being indicated at 4.

The discharge 3 is disposed at substantially a 45 degree angle formed as close to the upper edge of the bowl as possible, the outermost extremity of which is approximately on a level with the bottom of the trap.

The opening 5 through the wall of the bowl of the trap into the discharge 3 is of elliptical form, slightly more than one-half the diameter of the outer extremity of the discharge in depth, but sufficiently elongated to result in the capacity thereof being fully equal to the circular screw-threaded extremity 6 thereof.

Figure 1:
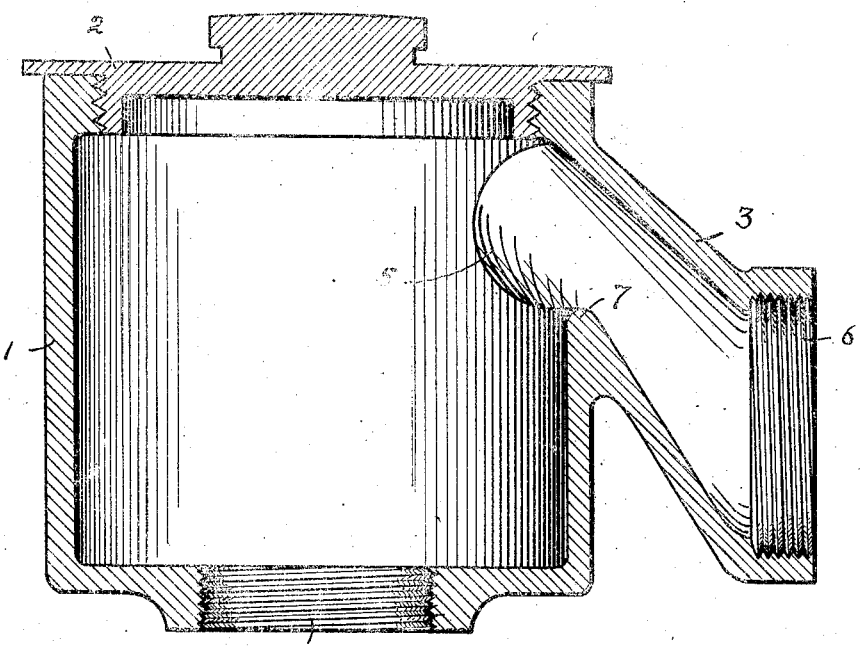
Figure 1 is a central vertical section of a full size trap embodying my invention.
Figure 2:
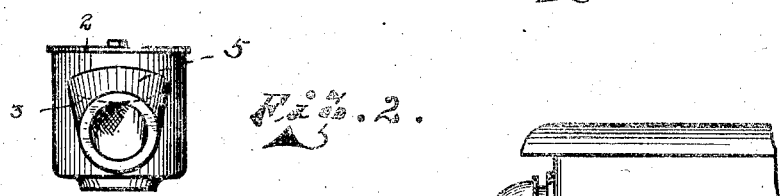
Figure 2 is a reduced side elevation of the trap as viewed from the discharge thereof.
Figure 3:
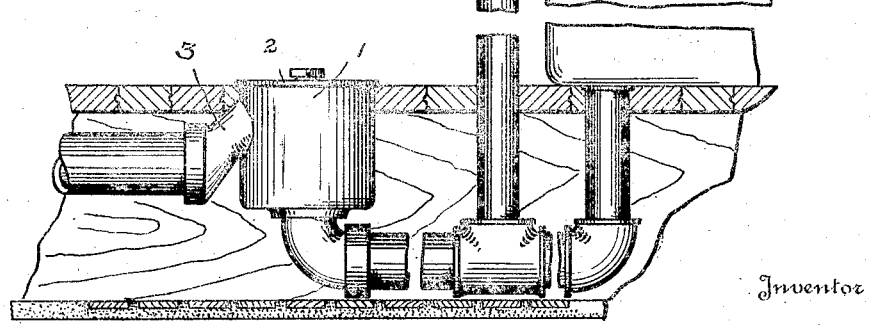
Figure 3 is an elevation of the trap as applied to a bath tub.

In this manner I am enabled to form the division wall 7 sufficiently high to provide the necessary depth of water seal within the trap as is clearly depicted in Figure 1 of the drawings, and still provide a bowl sufficiently foreshortened to be installed within an ordinary floor having but six inch joist therein. Whereas it is well known to those versed in the art that the ordinary drum trap in order to provide say two inches of water seal is in itself almost six inches in length which prohibits its installation with a six inch joist floor and necessitates either raising the bath room floor or projecting the connection intermediate of the trap and the bath tub below the under ceiling.

I am aware that traps have been made with both inclined discharge and inclined intake but not in the peculiar manner which involves my invention that the trap may be considerably foreshortened.

Having thus described my invention, what I claim and desire to secure by Letters Patent, is:

A drum trap comprising a cylindrical bowl having an axial entrance in the bottom thereof and a diagonally disposed branch discharge having an elliptical entrance into said bowl and a cylindrical discharge, the areas of the entrance and discharge of said branch being equal for the purpose described.

In testimony whereof I hereunto affix my signature.

RICHARD A. WALLIN.